United States Patent [19]

Hembrook, Jr.

[11] Patent Number: 4,974,354

[45] Date of Patent: Dec. 4, 1990

[54] VISUAL DISPLAY DEVICE FOR VEHICLES

[76] Inventor: Norbert Hembrook, Jr., 214A Kettle Moraine Dr. S., Slinger, Wis. 53086

[21] Appl. No.: 341,795

[22] Filed: Apr. 21, 1989

[51] Int. Cl.⁵ .............................................. G09F 13/18
[52] U.S. Cl. ......................................... 40/546; 40/591; 362/31; 340/470
[58] Field of Search ............. 40/546, 591, 549, 152.2, 40/452, 547, 564; 362/80.1, 31, 32, 251, 812; 340/470, 474

[56] References Cited

U.S. PATENT DOCUMENTS

| | | | |
|---|---|---|---|
| 2,044,300 | 6/1936 | Heans | 340/470 |
| 2,095,558 | 10/1937 | Oberacker | 40/546 |
| 2,464,535 | 3/1949 | Smith, Jr. | 340/470 |
| 2,503,336 | 4/1950 | Hines | 340/470 |
| 2,517,173 | 8/1950 | Blasingame | 340/470 |
| 2,605,338 | 7/1952 | Miller et al. | 340/470 |
| 2,678,457 | 7/1972 | Lev | 340/470 |
| 2,854,650 | 9/1958 | Baker et al. | 340/470 |
| 4,555,694 | 11/1985 | Yanagishima et al. | 40/546 |

Primary Examiner—Kenneth J. Dorner
Assistant Examiner—Brian K. Green
Attorney, Agent, or Firm—Andrus, Sceales, Starke & Sawall

[57] ABSTRACT

A visual display device for vehicles includes a message display unit adapted to be viewed from the exterior of the vehicle. The display unit may include a plurality of messages selectively illuminated by controls located inside of the vehicle. The messages are contained on translucent panels mounted in support members contained within a frame wherein light emitting elements contained in sockets formed along the edges of the message panels are used to selectively illuminate the desired display.

8 Claims, 2 Drawing Sheets

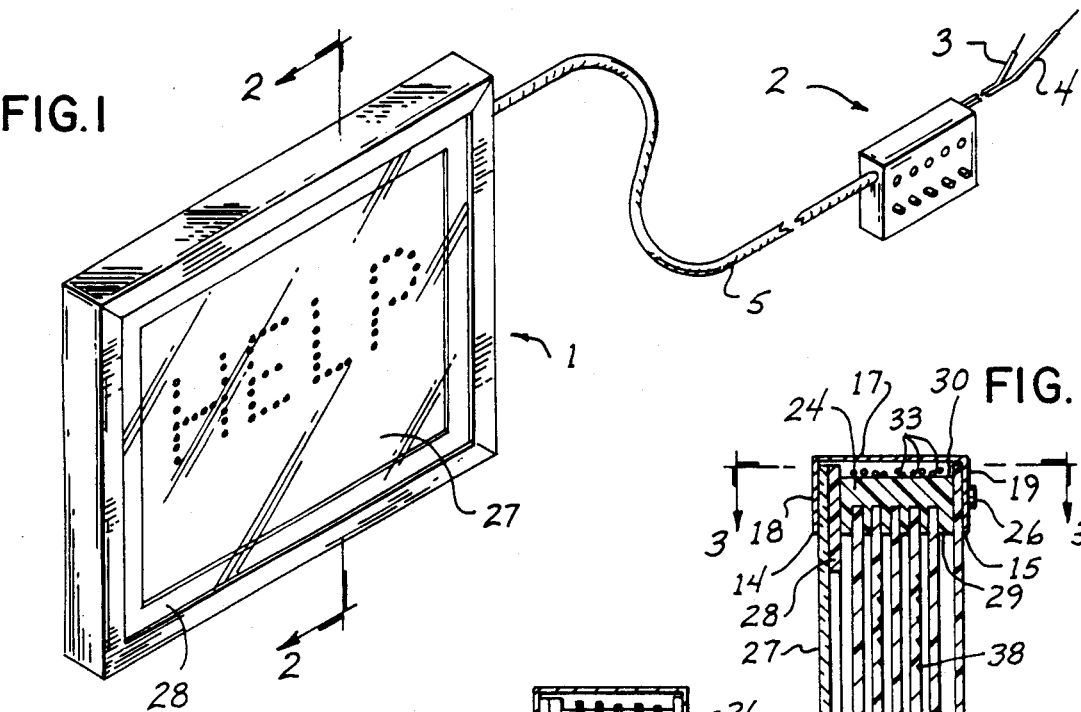
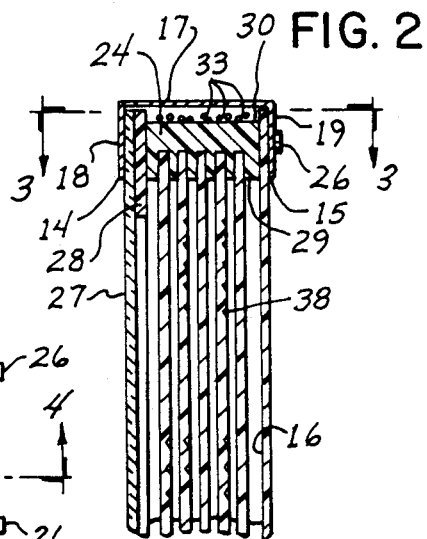
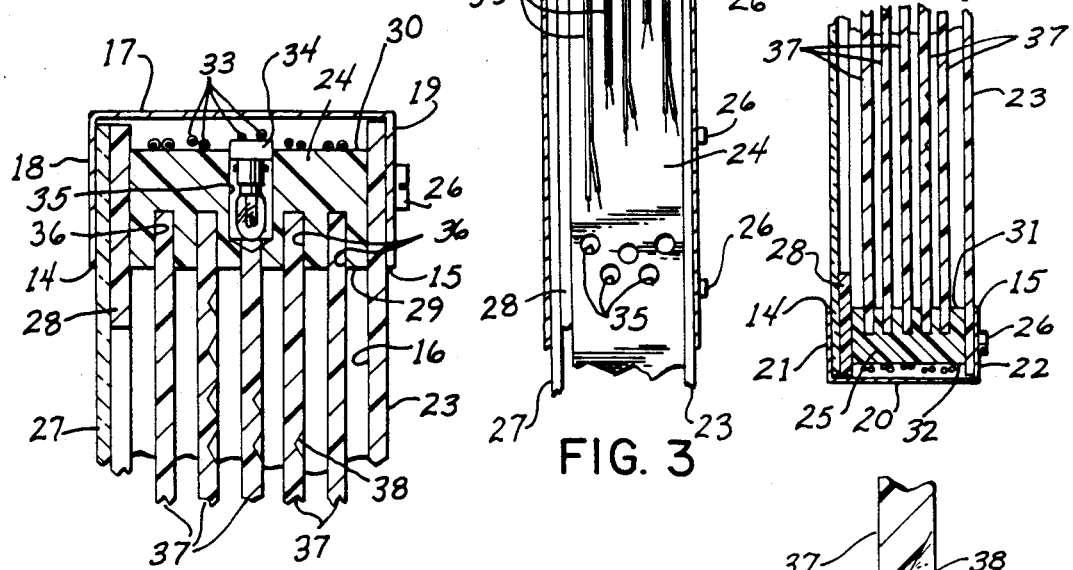
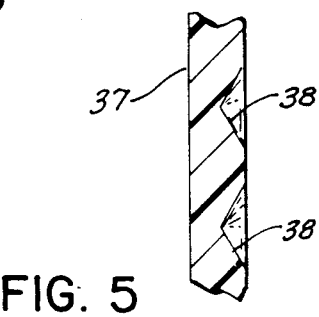

FIG. 6
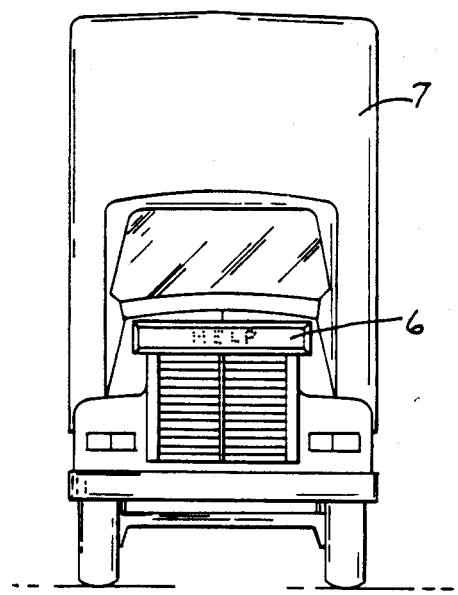
FIG. 7
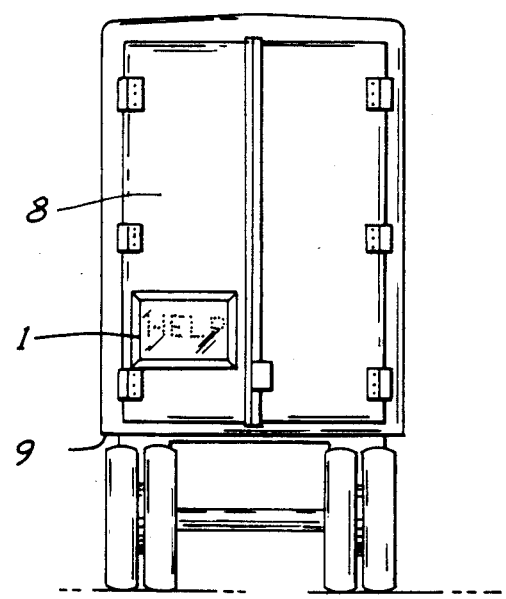
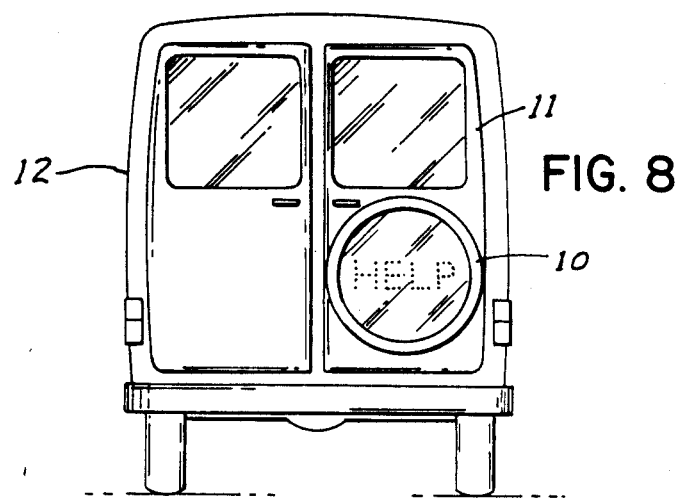
FIG. 8
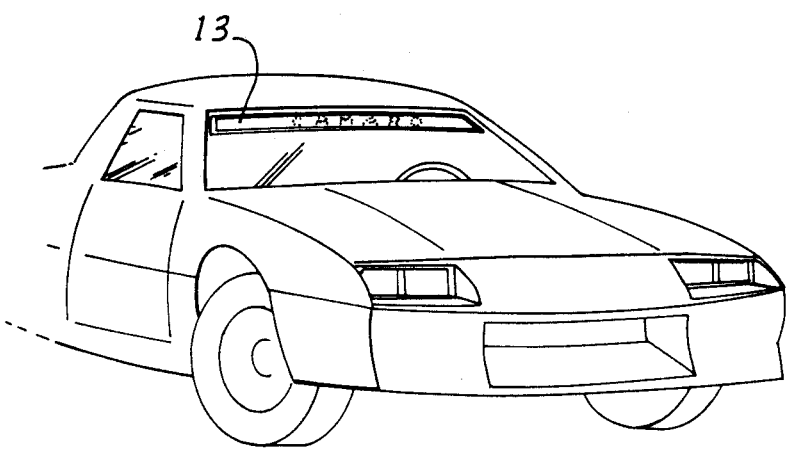
FIG. 9

VISUAL DISPLAY DEVICE FOR VEHICLES

BACKGROUND OF THE INVENTION

The present invention relates to devices for selectively displaying messages and more particularly to a visual display device for vehicles.

Visual display devices for use with vehicles are well known in the art and include such communication devices as turn signals and brake lights. Other such communication devices include fixed signs with appropriate printed messages. Still other types of communication devices have provided visual displays that can be selectively illuminated by controls located inside of the vehicle. Examples of the above devices can be found in the following U.S. patents:

| U.S. Pat. No. | Inventor | Issue Date |
| --- | --- | --- |
| 1,961,995 | Weller | 06-05-1934 |
| 2,517,173 | Blasingame | 08-01-1950 |
| 2,758,401 | Wilson | 08-14-1956 |
| 2,851,674 | Boone | 09-09-1958 |
| 2,854,650 | Baker et al | 09-30-1958 |
| 3,564,497 | Gazzo | 02-16-1971 |
| 4,264,979 | Gutowski | 04-28-1981 |
| 4,297,675 | Rubottom et al | 10-27-1981 |
| 4,328,481 | Sexton | 05-04-1982 |
| 4,361,828 | Hose | 11-30-1982 |
| 4,574,269 | Miller | 03-04-1986 |

Although devices such as those shown in the above patents do provide a wide range of communication possibilities, there remains a need for a multipurpose, inexpensive display unit that may be readily adaptable to be mounted at numerous locations on a vehicle. Additionally, such device should have the capability of selectively illuminating a plurality of messages by controls located inside of the vehicle.

SUMMARY OF THE INVENTION

The present invention provides a visual display device for vehicles adapted for being viewed from the outside of a vehicle and controlled from the inside of the vehicle. The unit is effective to display a plurality of messages, and is adapted to be employed with various types of vehicles and at various locations on the vehicles.

More specifically, the invention comprises a visual display device for vehicles including a frame having top, bottom and opposite side walls defining front and rear openings and an interior compartment, a rear panel closing the rear opening, a transparent front panel closing the front opening, and a support member disposed adjacent to both of the top and bottom members. Each support member defines an inner surface having a plurality of spaced slots formed therein and an outer surface having a plurality of spaced sockets formed therein in alignment with the slots and communicating therewith. A plurality of spaced translucent message panels having side edges contained in aligned slots of the support members and extend across the interior compartment to display a desired message. A plurality of light emitting elements contained in the sockets of the support members emit light into the side edges of the message panels to illuminate the desired message.

BRIEF DESCRIPTION OF THE DRAWINGS

The drawings illustrate the best mode presently contemplated of carrying out the invention.

In the drawings:

FIG. 1 is a perspective view of a visual display device constructed in accordance with the principles of the present invention;

FIG. 2 is a cross sectional side view in elevation taken along the plane of the lines 2—2 in FIG. 1;

FIG. 3 is a fragmentary cross sectional side view in elevation taken along the plane of the line 3—3 in FIG. 2;

FIG. 4 is a fragmentary enlarged cross sectional view taken along the plane of the line 4—4 in FIG. 3;

FIG. 5 is a fragmentary cross sectional enlarged view of a portion of a message panel;

FIG. 6 is a front elevational view of a truck incorporating a modified embodiment of the display unit in the form of a bug deflector;

FIG. 7 illustrates the display unit of FIG. 1 mounted on the rear of a truck;

FIG. 8 illustrates another embodiment of the display unit which is incorporated into a tire carrier shroud on the back of a van; and FIG. 9 illustrates still another embodiment of the invention wherein the display unit is located within the vehicle along the upper windshield thereof.

DESCRIPTION OF THE PREFERRED EMBODIMENTS

Referring now to the drawings, FIG. 1 illustrates a visual display device generally indicated by the numeral 1 for vehicles. The messages to be displayed by device 1 are selectively illuminated by an electrical message control unit 2 located inside of the vehicle and normally placed on the dashboard of the vehicle where it can be easily reached by the driver. The source of electrical power is typically the vehicle's battery or electrical system (not shown) which is connected via lines 3 and 4 to unit 2. In turn, control unit 2 communicates with display device 1 via cable 5.

Although illustrated in FIG. 1 in a substantially square shape, device 1 may be in a more elongated rectangular shape as shown in FIG. 6 wherein it is employed as a bug deflector 6 on the front of tractor trailer 7. As shown best in FIG. 7, device 1 may be typically mounted to a rear door 8 of a tractor trailer, or may be mounted to the underside of the bed of chassis 9 of the tractor trailer or may be mounted on the sides of the trailer. Additionally, the device of the present invention may be employed as a tire carrier shroud 10 mounted to a rear door 11 of a van 12 as illustrated in FIG. 8. Finally, as illustrated in FIG. 9 device 1 may be employed in the interior of the vehicle and a elongated rectangular unit 13 as illustrated in FIG. 9. Note that bug deflector 6 shown in FIG. 6 might also be employed with the automobile shown in FIG. 9 with minor modifications to the structure of device 1. Thus, device 1 may be modified into various shapes and configurations to accommodate a desired vehicular application.

Referring now to FIGS. 2-4, display device 1 includes a frame having top, bottom and opposite side members defining a front opening 14, a rear opening 15 and an interior compartment 16. As shown best in FIGS. 2 and 4, top frame member is U-shaped in cross section and is constructed of a side wall 17 interconnecting a front wall 18 and a rear wall 19. Likewise, bottom frame member is U-shaped in cross section and composed of a side wall 20 interconnecting a front wall 21 and rear wall 22. As shown best in FIG. 1, side frame members are also U-shaped in cross section and constructed in an identical manner as the top and bottom frame members. Although shown as an integral structure, side wall 17 of the top frame member could be slidably mounted on walls 18 and 19 to permit easy access to the interior compartment 16.

A rear panel 23 closes rear opening 15 and is rigidly held in position by having its edge margins sandwiched between rear walls 19 and 22 and a pair of top and bottom support members 24, 25 respectively. Screws 26 then extend through rear walls 19, 22 and the edge margins of rear panel 23 into support members 24, 25 to securely mount panel 23 in place. A transparent front panel 27 closes front opening 14 and is held in position by being sandwiched between front walls 18, 21 of the top and bottom frame members and the front of support members 24, 25 respectively. Additionally, a rectangular shaped rubber cushioning member 28 is disposed between the edge margins of front panel 27 and the front side of support members 24, 25.

Support members 24, 25 extend horizontally between front walls 18, 21 and rear walls 19, 22 of the top and bottom frame members respectively. Top support member 24 defines an inner surface 29 and an outer surface 30 and bottom support member 25 similarly defines an inner surface 31 and an outer surface 32. As shown best in FIGS. 2 and 4, outer surfaces 30, 32 are spaced from side walls 17, 20 in order to provide a passageway for receiving wire conductors 33 from cable 5. Conductors 33 communicate with a plurality of light emitting members or bulbs 34 disposed within a like plurality of sockets 35 formed in the outer surface of support members 24, 25. In turn, each socket 35 communicates with a respective slot 36 formed in the inner surface of support members 24, 25. Each slot 36 communicates with a socket 35 with sockets 35 typically formed in a staggered arrangement as shown best in FIG. 3. Alternately, the conductors 33 could be replaced by an appropriately designed printed circuit board.

A plurality of spaced translucent message panels 37 having side edges contained in aligned slots 36 of support members 24, 25 extend across interior compartment 16. As shown best in FIGS. 2 and 4, panels 37 are disposed in spaced relationship to one another and are received in aligned slots in the top and bottom support members 24, 25 so as to be substantially parallel to one another. As shown best in FIG. 5, each panel 37 includes a plurality of cone-shaped notches 38 formed in its rear surface and arranged in a matrix to form the letters of a desired message. For example, the word "help" as illustrated in FIG. 1. Each panel spells out a different message and thus, depending upon which message is to be illuminated, a driver actuates the appropriate switch in control unit 2 to illuminate the appropriate bulbs 34 which emit light into the side edges of the desired panel 37. Although five panels 37 are illustrated, and thus five switches in control unit 2, any number of panels may be employed depending upon the desired vehicular application.

Various modes of carrying out the invention are contemplated as being within the scope of the following claims particularly pointing out and distinctly claiming the subject matter regarded as the invention.

I claim:

1. A visual display device for vehicles, comprising:
   a frame including a plurality of frame members defining front and rear openings and an interior compartment;
   a rear panel closing said rear opening;
   a transparent front panel closing said front opening;
   a support member sandwiched between said front and rear panels and disposed adjacent to and spaced from said frame members, said support member defining an inner surface having a plurality of spaced slots formed therein and an outer surface having a plurality of spaced and staggered sockets formed therein in alignment with said slots and communicating therewith, said outer surfaces are spaced from said frame members to provide a passageway therebetween;
   a plurality of spaced translucent message panels having side edges contained in said slots of said support member and extending across said interior compartment; and
   a plurality of light emitting elements contained in said sockets for emitting light into the side edges of said message panels, said elements including conductor means disposed in said passageway communicating with a source of electrical power for said elements.

2. The device of claim 1 wherein each said top and bottom members are U-shaped in cross section having a side wall interconnecting front and rear walls.

3. The device of claim 2 wherein said support members extend horizontally between said front and rear walls.

4. The device of claim 3 wherein opposite side margins of said rear panel are sandwiched between said rear walls of said top and bottom members and said support members.

5. The device of claim 3 wherein opposite side margins of said front panel are sandwiched between said front walls of said top and bottom members and said support members.

6. The device of claim 5 further including a cushioning member disposed between the edge margins of said front panel and said support members.

7. The device of claim 1 wherein said message panels include notches formed therein opening rearwardly thereof, said notches arranged in a matrix to form letters of a desired message.

8. The device of claim 7 wherein said notches are cone-shaped.

* * * * *